Sept. 30, 1969    B. E. BARNES    3,469,282
TUBE COLLAPSING APPARATUS
Filed July 11, 1966
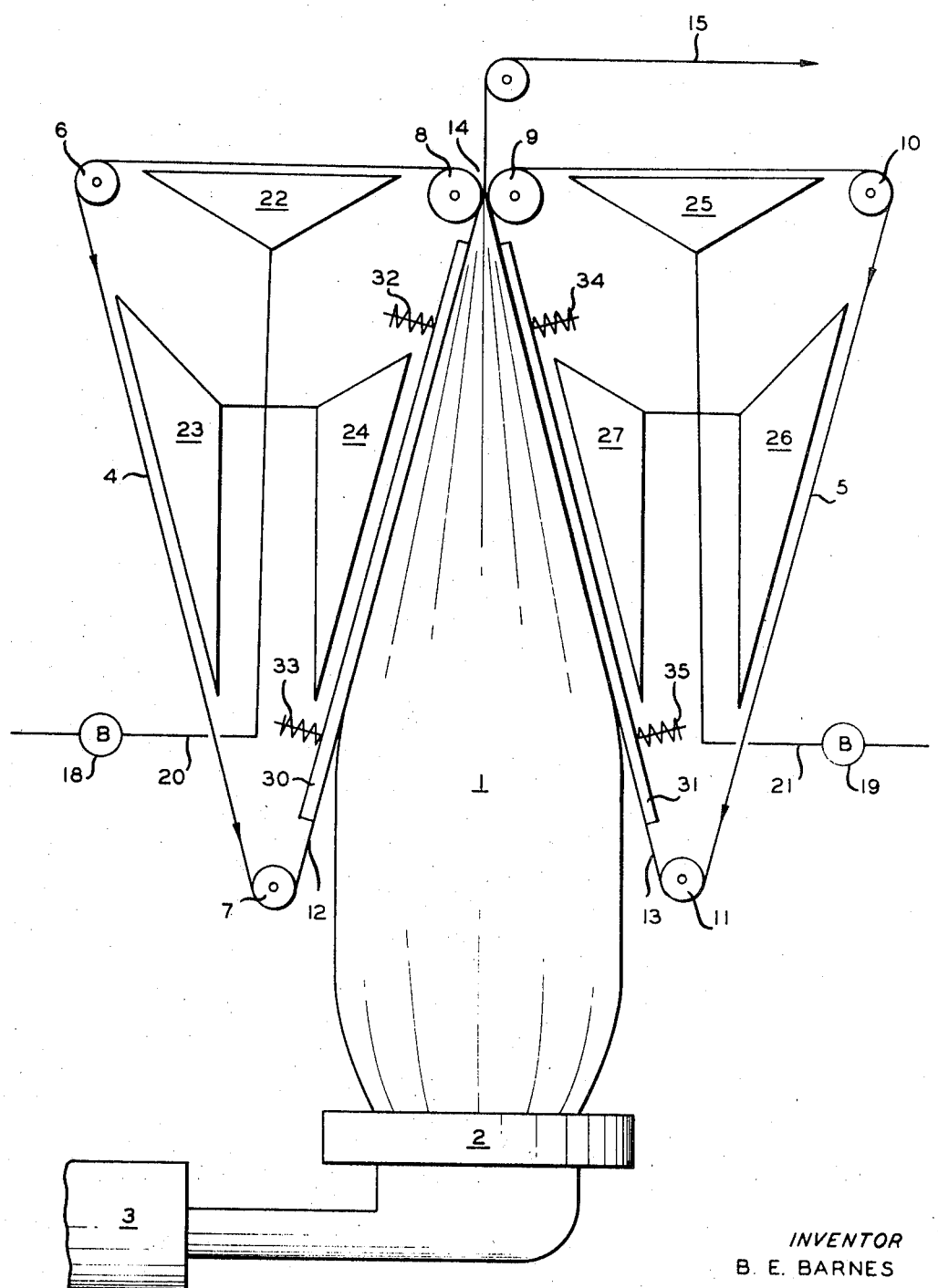
INVENTOR
B. E. BARNES
BY Young + Quigg
ATTORNEYS United States Patent Office 3,469,282
Patented Sept. 30, 1969

3,469,282
TUBE COLLAPSING APPARATUS
Bruce E. Barnes, Spartanburg, S.C., assignor to Phillips Petroleum Company, a corporation of Delaware
Filed July 11, 1966, Ser. No. 564,422
Int. Cl. B29c 17/07, 15/00
U.S. Cl. 18—14                     3 Claims

ABSTRACT OF THE DISCLOSURE

Apparatus for collapsing tubing which comprises contacting the tubing with a pair of movable surfaces having opposed, converging, substantially straight sides which move at substantially the same speed as the tubing so that there is relatively no movement between the surfaces and the tubing and artificially cooling the movable surfaces when they are in contact with the tubing and at a zone remote from the zone where the surfaces are in contact with the tubing.

---

This invention relates to a method and apparatus for collapsing film tubing.

Heretofore fixed wooden or metal frames have been employed to collapse plastic film tubing but these frames, because they were fixed, scratched the tubing thereby greatly impairing the optical properties of the film formed from the collapsed tubing. Further, these frames were subject to being heated by the tubing with which they were in contact, for example if the tubing being collapsed had just issued from an extrusion die, and the more the frame became heated the more it tended to stick to the tubing and tear holes in same.

Also heretofore tubing has been collapsed by using a plurality of undriven rollers arranged in a converging manner. These rollers are idler rollers caused to rotate by the tubing passing thereover. Therefore, there is some relative movement between the tubing itself and these rollers and this movement is in itself sufficient to cause enough scratching of the tubing to impair the optical properties thereof. Also, these rollers tend also to become heated by contact with hot tubing. Besides the fact that heated rollers tend to promote sticking of the tubing, they also delay cooling of the tubing, which in the case of a recently extruded tube of plastic film will impair the clarity of the final film because the quicker the tube is cooled the better the clarity of the final film.

According to this invention apparatus is employed for collapsing film tubing comprising at least one pair of belts each having opposing substantially straight sides which define a tubing collapsing zone, the straight sides being relatively long to provide a substantial time period during which these sides can be in contact with the tubing, and means for moving the belts at substantially the same speed as the tubing. Further, the apparatus of the invention can employ one or more cooling means for cooling at least the straight sides of the belts.

Also by this invention there is provided a method for collapsing film tubing wherein the tubing is passed in contact with at least one pair of straight surfaces, the surfaces being sufficiently long to maintain contact between those surfaces and the tubing for substantial periods of time. Also according to this invention the straight surfaces are artificially cooled.

By the apparatus and method of this invention substantially no scratching of the tubing is effected since the converging surfaces that collapse the tubing are moving at substantially the same speed as the tubing itself. Also, the surfaces for collapsing the tubing are artificially cooled thereby more quickly cooling heated film to obtain a better clarity of the final product film and to eliminate sticking of the film to the collapsing mechanism. Further, the particular cooling system of this invention allows for better cooling control in that it can be used in one or more places along the length of the moving surfaces not only to obtain better cooling but to allow for rapid change in the degree of cooling of the tubing should the wall thickness of the tubing abruptly change or any other phenomenon occur which would require a change in the degree of cooling. Thus by this invention the amount of cooling employed can be tailored to the specific tubing to be collapsed. Also, by this invention the straight surfaces for collapsing the film when in a belt or similar form can be cooled when not in contact with the film to be collapsed. Thus, the straight surfaces can be precooled before coming into contact with the film to be collapsed. The cooling of the straight surfaces when not in contact with the film was not possible with prior collapsing means such as the fixed frame and the like.

Accordingly, an object of this invention is to provide a new and improved apparatus for collapsing tubing. Another object of this invention is to provide a new and improved method for collapsing tubing.

Other aspects, objects, and the several advantages of this invention will be apparent to those skilled in the art from the description, drawing, and appended claims.

In the drawing there is shown apparatus embodying this invention.

In the drawing there is shown plastic film tubing 1 issuing from extrusion die 2 which is connected to extruder tube 3, the remainder of the extrusion apparatus being conventional and therefore not shown. The tubing passes between a pair of endless belts composed of belts 4 and 5 which belts are maintained in a triangular configuration by rolls 6 through 11. Straight surfaces 12 and 13 of belts 4 and 5 converage toward one another and toward outlet end 14 to define a tube collapsing zone from which issues a flattened film 15 suitable for takeup and storage or other treatment as desired.

Air blowers 18 and 19 are connected through conduits 20 nd 21 to outlet vents 22, 23, and 24, and 25, 26, and 27, respectively.

Straight surfaces 12 and 13 are resiliently supported by backup members 30 and 31 which are resiliently supported so as to firmly press surfaces 12 and 13 against tubing 1 but to be yieldable enough to accommodate tubing 1 if its diameter should abruptly change or anything else occur which would require surfaces 12 and 13 to be further spaced from one another. Members 30 and 31 can be resiliently mounted in any conventional manner including the use of springs 32 through 35. Members 30 and 31 are optional and can be omitted if desired.

The belts 4 and 5 can be made of any conventional material which is substantially inert to the tubing with which it is to come in contact and can include any conventional belt material such as rubber, polytetrafluoroethylene coated metal belts, or any other heat resistant fabric such as fabric formed from synthetic fibers such as fiberglass, and the like.

Although the apparatus and method of this invention are disclosed with respect to extruded plastic tubing, this invention is also applicable simply to collapsing of tubing however it is formed, what its composition is, and whatever condition it may be in.

This invention is applicable to the collapsing of any tubing no matter what it is made of, but is particularly applicable to the collapsing of plastic film tubing such as tubing formed from one or more 1-olefins having from 2 to 8 carbon atoms per molecule, inclusive, and blends thereof, as well as polyamides, polyesters, polyvinyl alcohol, acrylic polymers, polyvinyl chloride, polyvinylidene chloride, polyvinyl acetate, blends thereof, and the like.

Belts 4 and 5 are preferably cooled by using blasts of cool fluid, preferably gas, against one or more areas of the belts. Although outlets against all three interior sides of belts 4 and 5 are shown in the drawing, one or two outlets or completely separate blowers can be employed on each belt as well as in any place on the belt. For example, a single outlet can be employed on the interior side of each belt, the outlets impinging fluid on the inner sides of straight surfaces 12 and 13. By the use of fluid blowers the amount of cooling of the belts can be very rapidly changed thereby providing great flexibility in the in the degree of cooling of tubing 1. Thus, by this invention the cooling of the tubing is tailored to the specific composition and wall thickness of the tubing thereby obtaining maximum clarity of the tubing as well as maximum optical properties while retaining the capability for immediately changing the degree of cooling at any given moment without stopping the collapsing process.

Thus, it can be seen that there are many advantages inherent in the process and apparatus of this invention and these advantages are particularly applicable to just formed, hot, plastic tubing.

Belts 4 and 5 can be driven by driving rolls 8 and 9, or any other rolls in contact with belts 4 and 5, at a speed which causes the converging surfaces 12 and 13 to move with tubing 1 at substantially the same speed as that tubing. Generally, the tubing will move through the collapsing zone at a rate of from about 3 to about 300 feet per minute and the speed of belts 4 and 5 will be adjusted accordingly, a primary requirement being that no relative motion be effected between straight surfaces 12 and 13 and the tubing.

EXAMPLE

Extruded, blown tubing having a 2 mil wall thickness, a 10 inch diameter, and composed of a homopolymer of polyethylene having a density of 0.96 gram per cubic centimeter at 25° C. and a melt index of 0.9 is flattened to form a 4 mil thick film using the apparatus shown in the drawing.

The inlet ends of the collapsing zone of the apparatus is about 14 inches across and the outlet end 14 is about 3 mils across. The belts are formed from conventional hard rubber conveyor belt material and 100 p.s.i.g. air cooled to about 20° F. below the ambient temperature is sprayed against the inner sides of straight surfaces 12 and 13. Tubing 1 passes between belts 4 and 5 at about 30 feet per minute and belts 4 and 5 are driven by rollers 8 and 9 at substantially the same speed so that there is substantially no relative movement between straight surfaces 12 and 13 and tubing 1.

The 4 mil thick product film has good clarity because of its rapid cooling and substantially no scratches on the surface thereof that would affect the optical properties of the film to any substantial degree.

I claim:
1. Apparatus for collapsing tubing comprising an extruding device, at least one pair of movable surfaces having opposed, converging, substantially straight sides that define a tubing collapsing zone in alignment with said extruding device, said straight sides converging toward one another from the inlet end to the outlet end of said collapsing zone, said straight sides being relatively long to provide a substantial time period during which said sides are available for contacting said tubing, means for moving said surfaces at substantially the same speed as said tubing so that there is substantially no relative movement between said surfaces and the tubing with which they are in contact, and means for artificially cooling the moveable surfaces when said sides are in contact with the tubing and at a zone remote from the zone where the sides are in contact with the tubing.

2. The apparatus according to claim 1 wherein said moveable surfaces comprise at least one pair of continuous belts, and said means for artificially cooling comprises means for impinging variable amounts of a cooling fluid on the straight sides of said belts and the remainder of said belts that is not in position to contact said tubing.

3. The apparatus according to claim 2 wherein said belts are mounted in a triangular fashion, said straight sides being formed from at least one side of each triangle formed by each belt, the zone remote from the zone where the sides are in contact with the tubing which are artificially cooled by said cooling fluid being the other two sides of each triangle formed by each belt, and means for moving each of said belts comprising a driven roller positioned at the outlet of the collapsing zone and a pair of idler rollers positioned within the other two angles of the triangle formed by each of said belts.

References Cited

UNITED STATES PATENTS

| | | | |
|---|---|---|---|
| 2,448,433 | 8/1948 | Irons et al. | 264—237 |
| 2,559,386 | 7/1951 | Bailey | 264—95 |
| 2,559,649 | 7/1951 | Little et al. | 264—216 |
| 3,002,430 | 10/1961 | Voight et al. | 18—145 |

FOREIGN PATENTS 589,775    1959    Italy.

ROBERT F. WHITE, Primary Examiner

JEFFERY R. THURLOW, Assistant Examiner

U.S. Cl. X.R.

264—95